United States Patent Office 3,355,307
Patented Nov. 28, 1967

3,355,307
SINGLE MIX STARCH ADHESIVE
John J. Schoenberger, Downers Grove, and Raymond P. Citko, Chicago, Ill., assignors to Corn Products Company, New York, N.Y., a corporation of Delaware
No Drawing. Filed Sept. 21, 1964, Ser. No. 398,061
10 Claims. (Cl. 106—213)

The present invention relates to an improved starch adhesive suitable for preparing corrugated paperboard. More particularly, the present invention relates to the preparation of a no carrier corrugating adhesive, i.e., a single mix adhesive formulation, rather than the conventional two component adhesive.

Corrugated paperboard presently is manufactured in a continuous operation involving several steps. A strip of paper, slightly moistened, is passed through heated flute rolls. To one side of the heated fluted paper, adhesive is applied to the tip edge of each flute. Immediately thereafter, a strip of liner paper is brought into contact with the adhesive-treated flutes of the corrugated paper in the presence of heat and pressure resulting in the formation of a strong adhesive bond. This product is known in the art as "single facer" corrugated paperboard.

Another type of corrugated paperboard is the "double backer." The double backer is prepared by applying adhesive to the exposed flutes of the single facer board and bonding a second liner to the adhesive-tipped flutes. The application of the second liner is more difficult than that of the first liner because less pressure can be applied during the setting and bonding of the adhesive lest the corrugated strip be crushed. Because less heat and pressure are available for bonding the second liner to the flutes, it is frequently necessary to use a slightly different adhesive formulation for the attachment of the second liner.

Corrugated paperboards are prepared at machine speeds up to at least 600 feet per minute. Such instantaneous adhesive bonding indeed requires a very special adhesive. The adhesive must be sufficiently viscous to remain in position on the tip of the flute when applied and to fill any depressions inherently possessed by the paper. In addition, it must be capable of "instant bonding" when heat and light pressure are applied since, at present machine speeds, even a double backer corrugated paperboard is formed entirely in less than one minute.

Starch adhesives are presently being used in the corrugating industry; however, such adhesives are all two-component adhesives requiring special mixing and holding machines. The two components consist of a carrier starch portion and a raw starch portion. The carrier portion contains gelatinized starch which when mixed with the raw (ungelatinized) starch portion, acts as a "carrier" or suspending agent for the ungelatinized starch. The strength of a starch adhesive bond in the corrugating industry is dependent upon the swelling and subsequent gelatinization of the ungelatinized starch portion. Therefore, the ideal corrugating adhesive would contain only ungelatinized starch. Prior to the present invention this was believed impossible.

It is an object of the present invention to provide a process for preparing a corrugating adhesive wherein ungelatinized starch is chemically treated to act as its own carrier and at the same time not overtreated, so that it remains in ungelatinized form.

It is an object of the present invention to provide a corrugating adhesive which is simple, uniform, and homogeneous, and which is a one component system.

It is an object of the present invention to provide a corrugating adhesive having improved water-holding properties.

It is another object of the present invention to provide a corrugating adhesive having improved viscosity stability.

It is another object of the present invention to provide a method for preparing a starch-containing corrugating adhesive which eliminates need for cooking, and, as a result, eliminates the conventionally required two tank starch system.

It is another object of the present invention to provide a method for preparing an improved corrugating adhesive which method shortens preparation time.

It is another object of the present invention to provide corrugated paperboard having superior bonding.

It is another object of the present invention to provide a corrugated paperboard having less tendency toward warp than heretofore.

Other objects and advantages of the present invention will be obvious to those skilled in the art from the description which follows.

In the present invention raw starch is treated with alkali under specific temperature and concentration conditions to partially swell the granules of starch in the suspension. The swelling reaction is stopped at a certain time to insure the proper degree of swelling.

The present invention provides a process for preparing a corrugating adhesive which comprises commingly ungelatinized starch selected from the group consisting of unmodified starch and chemically modified starch, water, and alkali in proportions such that the resulting slurry contains between about 10% and about 40% solids by weight, and the pH of the slurry is between about 8 and about 13, and reacting said slurry at a temperature of about 70° to about 165° F. for not more than one hour.

The present invention also provides a corrugating adhesive containing ungelatinized, partially swollen starch, at a solids concentration of between about 10% and about 40%, preferably between about 12% and about 30%, and having a gel point between about 135° and about 160° F., preferably between about 144° and about 152° F., a pH between about 8 and about 13, preferably between about 11 and about 12.5, at a reaction temperature of about 70° to about 165° F., preferably about 100 to about 125° F., and the final composition having a Stein Hall viscosity of about 20 to about 90 seconds, preferably about 25 to about 40 seconds.

The constituents, i.e. starch, alkali, and water, may be admixed in any desired order. The manner in which the paste slurry is assembled is partially dependent upon the desired characteristics of the adhesive. For instance, the ratio of alkali to starch to water varies according to the temperature selected for the reaction. It is necessary to obtain an adhesive paste having a gel point in the range of 135° F. to 160° F. It is presently known by those skilled in the art how to vary the concentration of the constituents and the reaction temperature in order to obtain a satisfactory adhesive paste. The examples below illustrate some of the possible combinations which produce satisfactory adhesive pastes having superior bonding properties.

As previously mentioned, in the present invention ungelatinized starch is chemically treated to produce a partially swollen starch suspension. In order to prevent over-treatment the swelling is stopped at a certain time. The stopping of the reaction may be achieved in one of several ways as, for example, by the addition of borax, alum, cold water, ice, and acid material, etc. In essence, any addition or alteration which causes the characteristics of the reaction mixture to fall outside those required for swelling the starch, is satisfactory for use as a reaction stopper.

Suitable starches include unmodified ungelatinized starch such as corn starch, tapioca starch, milo starch, waxy maize starch, wheat starch, potato starch, and the like, and chemically modified ungelatinized starch such as oxidized starch, acid-modified starch, enzyme-modified starch, chemically derivatized starch, i.e. starch ethers and starch esters, and the like.

In the following examples, all viscosities were measured in a standard Stein Hall cup, hereinafter referred to as S.H. viscosity. The caustic used in each example was sodium hydroxide; however, potassium hydroxide or other alkaline materials are equally satisfactory.

*Example I*

A starch and water slurry was prepared by admixing 500 gms. of unmodified ungelatinized corn starch with 1782 mls. water at 100° F. To this slurry was added 500 mls. water containing 17 gms. of caustic at 170° F. This mixture was agitated and allowed to react for 15 minutes. Alum in the amount of 5 gms. in 15 mls. water was added and the mixture was agitated for 5 minutes. The resulting corrugating adhesive paste had an initial Stein Hall cup viscosity of 33 seconds; after 2 hours it was 32 seconds and after 24 hours it was 33 seconds. The gel point of the paste was 147–159° F.

*Example II*

This example illustrates a variance in reaction time wherein satisfactory pastes are made in as little as one minute reaction time or as long as one hour.

Water and caustic combined in the amount of 500 mls. and 17 gms. respectively at 180° F. were added to a slurry of 500 gms. of ungelatinized slightly acid modified corn starch (having a fluidity of 7) and 1782 mls. of water at 110° F. The caustic and water mixture was added over a period of 2 minutes. The resulting mixture was mixed 60 seconds and 3 gms. of alum in 15 mls. of water was added to stop the reaction. The entire mixture was mixed 5 minutes and the final composition had a Stein Hall viscosity of 42 and a gel point of 144–146° F. The temperature of the mixture during the 60 second reaction time was 124° F.

The same ingredients were used to produce an adhesive in which the reaction time was one hour. Because the reaction took place over a long period of time it was necessary to carry out the reaction at a lower temperature to prevent excessive swelling of the starch granules. The water and caustic mixture was at 170° F. when it was added to the starch and water slurry which was at 95° F. The reaction temperature maintained during the one hour reaction period was 107° F. The resulting composition had a Stein Hall viscosity at the end of one hour of 30 and a gel point of 142–144° F. Also, because the reaction time was more lengthy, only 1.4 grams of alum was required to stop the reaction at the end of one hour.

*Example III*

This example illustrates a variance in reaction temperature wherein satisfactory pastes are obtained with reaction temperatures at a range from 80° F. to 144° F. The same general procedure was used in this example as in Example II, wherein water and caustic in solution were added to a starch and water slurry at the temperatures and proportions set forth in the table below. It will be noted that more caustic was required at the lower reaction temperature in order to achieve sufficient swelling of the starch granules at the temperature. The starch used in this example was ungelatinized unmodified corn starch.

TABLE I

Reaction temperature—High, 144° F.:
  At 190° F.:
    Water _____ mls__ 500
    Caustic _____ gms__ 10
  At 137° F.:
    Water _____ mls__ 1782
    Starch _____ gms__ 500
      Mix 1 minute.
    Alum _____ gms__ 2.0
      Add ice to cool to 120° F., mixing complete time.

Results:
  S.H. viscosity:
    5 minutes _____ 56
    10 minutes _____ 56
  Gel point, ° F. _____ 154–156
  pH _____ 12.0
Reaction temperature—Low, 80° F.:
  At 165° F.:
    Water _____ mls__ 500
    Caustic _____ gms__ 30
  At 620° F.:
    Water _____ mls__ 1782
    Starch _____ gms__ 500
      Mix 1 minute.
    Alum _____ gms__ 5.0
      Mix 5 minutes.
Results:
  S.H. viscosity _____ 90
  Reaction pH _____ 12.6

*Example IV*

This example illustrates a variance in gel point wherein satisfactory pastes are obtained under different mixing conditions to give a gel point varying from 136° F. to 158° F. The same proportions of water, caustic and starch were used as in Example II above. The water and caustic mixture at 170° F. was added to the water and starch mixture at 100° F. This mixture was allowed to react for 10 minutes while under agitation. Alum in the amount of 10 grams was added and the mixture agitated for 5 minutes. The resulting paste had a Stein Hall viscosity of 29 and a gel point of 156–158° F.

Water, caustic and starch in the same amounts as above were combined as follows: The water and caustic mixture at 170° F. was added to the starch and water mixture at 95° F. The resulting mixture was mixed for 60 minutes after which time the Stein Hall viscosity was 30 and the gel point 136–138° F. The reaction temperature was 103° F., and because it was low, it was unnecessary to add a reaction stopper. The starch used in this example was ungelatinized slightly acid-modified corn starch having a fluidity of 7.

*Example V*

This example illustrates a variance in solids content wherein satisfactory pastes are obtained with a variance of solids from 10 to 35% dry basis.

Water and caustic in the amount of 500 mls. and 15 gms., respectively, at 170° F. was added to a mixture of starch and water at 100° F. containing 1782 mls. of water and 250 gms. of starch. This mixture was allowed to react for 6 minutes after which 5 gms. of alum were added and the entire mixture agitated for 5 minutes. The resulting paste had a Stein Hall viscosity of 35 and a gel point of 147–149° F. On a dry basis the solids content of this paste was 10%.

At the same temperature as above, water and caustic in the amount of 500 mls. and 30 gms, respectively was added to 1450 mls. of water and 1050 gms. of starch. This mixture was allowed to react for 12 minutes. It was necessary to extend the reaction time because the higher solids content, on a dry basis, of 35% caused the reaction to proceed more slowly. After 12 minutes, alum in the amount of 5 gms. was added and the entire mixture agitated for 5 minutes. The resulting paste had a Stein Hall viscosity of 30 and a satisfactory gel point. The same starch was used in this as in Example IV.

*Example VI*

This example illustrates the suitability of various types of starch in either unmodified or chemically modified form. In each instance in Table II below, the water and caustic mixture was added to the water and starch mixture and the reaction allowed to proceed for the amount of time mentioned immediately below the starch. These times varied according to the time required by the particular type of starch to swell to the desired degree.

TABLE II

Ungelatinized tapioca starch:
  At 170° F.:
    Water _____ mls__ 500
    Caustic _____ gms__ 16
  At 100° F.:
    Water _____ mls__ 1782
    Starch _____ gms__ 500
      Mix 5 minutes.
    Alum _____ gms__ 1.4
      Mix 5 minutes.
Results:
  S.H. viscosity, sec. _____ 90
  Gel point, ° F. _____ 140–142

Ungelatinized milo starch:
  At 170° F.:
    Water _____ mls__ 500
    Caustic _____ gms__ 20
  At 100° F.:
    Water _____ mls__ 1782
    Starch _____ gms__ 500
      Mix 5 minutes.
    Alum _____ gms./mls__ 1.6/15
      Mix 5 minutes.
Results:
  S.H. Viscosity, sec. _____ 76
  Gel point, ° F. _____ 142–144

Potato starch:
  At 130° F.:
    Water _____ mls__ 500
    Caustic _____ gms__ 10
  At 100° F.:
    Water _____ mls__ 1782
    Potato starch _____ gms__ 500
      Drop caustic in 2 minutes.
      Mix 2 minutes after caustic is dropped.
    Alum _____ gms./mls__ 2.5/15
      Mix 10 minutes.
Results:
  S.H. viscosity, sec. _____ 44
  Gel point, ° F. _____ 140–142
  pH _____ 11.3

Wheat starch:
  At 130° F.:
    Water _____ mls__ 500
    Caustic _____ gms__ 14
  At 100° F.:
    Water _____ mls__ 1782
    Wheat starch _____ gms__ 500
      Drop caustic in 2 minutes.
      Mix 15 minutes after caustic is dropped.
    Alum _____ gms./mls__ 3.0/15
Results:
  S.H. viscosity, sec. _____ 32
  Gel point, ° F. _____ 140–142
  pH _____ 11.6

Ungelatinized acid-modified corn starch:
  Slight acid modification (fluidity 7):
    At 170° F.:
      Water _____ mls__ 500
      Caustic _____ gms__ 17
    At 100° F.:
      Water _____ mls__ 1782
      Starch _____ gms__ 500
        Mix 17 minutes.
      Alum _____ gms./mls__ 4/15
        Mix 5 minutes.
  Results:
    S.H. viscosity, sec. _____ 37
    Gel point, ° F. _____ 146–148
  High acid modification (fluidity 82):
    At 170° F.:
      Water _____ mls__ 500
      Caustic _____ gms__ 30
    At 100° F.:
      Water _____ mls__ 1450
      Starch _____ gms__ 1050
        Mix 12 minutes.
      Alum _____ gms__ 5
        Mix 5 minutes.
  Results: S.H. viscosity, sec. _____ 30

Starch ester (cross-bonded distarch phosphate ester of corn starch):
  At 170° F.:
    Water _____ mls__ 500
    Caustic _____ gms__ 18
  At 100° F.:
    Water _____ mls__ 1782
    Starch _____ gms__ 500
      Mix 20 minutes.
    Alum _____ gms./mls__ 3/15
      Mix 5 minutes.
Results:
  S.H. viscosity, sec. _____ 30
  Gel point, ° F. _____ 147–149

Starch ether (hydroxy ethyl corn starch degree of substitution 0.10):
  At 170° F.:
    Water _____ mls__ 500
    Caustic _____ gms__ 18
  At 100° F.:
    Water _____ mls__ 1782
    Starch _____ gms__ 500
      Mix 25 minutes.
    Alum _____ gms./mls__ 5/15
      Mix 5 minutes.
Results:
  S.H. viscosity, sec. _____ 41
  Gel point, ° F. _____ 146–148

*Example VII*

This example illustrates a variance in pH wherein satisfactory pastes are obtained under pH conditions ranging from 8.0 to 12.6. In each instance in Table III below, the water and caustic mixture was added to the water and starch mixture and the reaction permitted to proceed for the time indicated. At pH 8.0 and 10.3, it will be noted that ice was used to cool the mixture in order to terminate the reaction. Because the pH was lower in these instances, it was not necessary to use alum to stop the reaction. The starch used in this example was unmodified ungelatinized corn starch. In each instance the gel point fell between the desired range of 135° F. to 160° F.:

TABLE III

Reaction pH, 8.0:
  At 190° F.:
    Water _____ mls__ 500
    Caustic _____ gms__ 0.25
  At 148° F.:
    Water _____ mls__ 1782
    Starch _____ gms__ 500
      Mix 10 minutes and add ice to cool to about 120° F.
Results: S.H. viscosity, sec. _____ 25
Reaction pH, 10.3:
  At 190° F.:
    Water _____ mls__ 500
    Caustic _____ gm__ 1

TABLE III—Continued

At 136° F.:
Water _____ mls__ 1782
Starch _____ gms__ 500
Mix 30 minutes.
Add ice to cool to 120° F.
Results: S.H. viscosity, sec. _____ 20
Reaction pH, 12.6:
At 165° F.:
Water _____ mls__ 500
Caustic _____ gms__ 30
At 62° F.:
Water _____ mls__ 1782
Starch _____ gms__ 500
Mix 1 minute.
Alum _____ gms__ 5.0
Mix 5 minutes.
Results: S.H. viscosity, sec. _____ 90

*Example VIII*

This example illustrates the use of borax as a reaction termination agent. Water and starch at 100° F. in the amount of 2158 mls. and 500 gms., respectively, were mixed 3 minutes. After 3 minutes 17 gms. of caustic in 25 mls. of water was added and the resulting mixture agitated for 10 minutes. Eleven grams of borax (sodium borate) were added and the final mixture agitated for 20 minutes. The resulting paste had a Stein Hall viscosity of 38, a pH of 12.2, and a gel point of 141–143° F. The starch used in this example was unmodified ungelatinized corn starch.

All of the adhesive pastes prepared in Examples I through VIII are suitable for use as corrugating adhesive pastes in a commercial corrugating plant. Use of a representative paste of the present invention to produce a corrugated board is illustrated in Example IX.

*Example IX*

Ungelatinized slightly acid-modified corn starch having a fluidity of 7 in the amount of 1000 lbs. was slurried in 427 gals. of water at 100° F. To this slurry was added a solution of 34 lbs. of caustic in 120 gals. of water at 170° F. The caustic solution was added to the starch slurry over a period of 4 minutes resulting in a final temperature for the mixture of 116° F. The mixture was allowed to react under agitation for about 6 minutes. Viscosity readings during reaction were as follows:

| Time: | S.H. viscosity |
|---|---|
| 1 minute 30 seconds | 19 |
| 4 minutes 30 seconds | 40 |
| 6 minutes 10 seconds | 56 |

Alum in the amount of 2.8 lbs. in 3.6 gals. of water was admixed with the reaction mixture. After 8 minutes the S.H. viscosity was 72 so an additional quantity of 1.5 lbs. of alum was added. After 32 minutes the temperature of the paste was 115° F. and the S.H. viscosity 66. Ten gallons of water was added to cool the paste of 110° F. The final paste had an S.H. viscosity of 59. Both single facer and double backer corrugated boards were made with this paste at machine speeds of 400 to 500 feet per minute. The resulting boards were superior in the flat crush test wherein the boards stood over 210 p.s.i pressure before crushing. In addition, in a standard pin adhesion test the flutes were decapped in each pin test performed. The pin adhesion test is measured in pounds necessary to pull 2 linear feet of liner from the corrugated board at the glue line. In each instance, the corrugated board of this example required more pull to separate the liner than conventionally prepared corrugated boards and when the board of the present example did separate, the flutes were decapped in each instance. Decapped flutes exemplify a corrugated board of superior bonding strength.

Although the invention has been described with certain specific embodiments thereof, it is intended that such matters be purely illustrative for the purpose of clarifying the invention, and that the invention is in no sense limited thereto. Numerous modifications of the present invention will be apparent to those skilled in the art.

We claim:
1. A process for preparing a corrugating adhesive which comprises:
   (1) preparing a heated reaction mixture of ungelatinized starch selected from the group consisting of unmodified starch and chemically modified starch, water, and alkali in proportions such that the mixture contains between about 10% and about 40% starch solids by weight and the pH is between about 8 and about 13, with the temperature of said mixture ranging from about 165° F. to about 70° F.;
   (2) allowing the reaction to proceed until a Stein Hall viscosity of about 20 to about 90 seconds is reached, and
   (3) stopping the reaction by addition of a reaction stopper whereby the gel point of the reaction mixture after said series of steps is thus adjusted to between about 135° F. and about 160° F.

2. A process as in claim 1 wherein the reaction stopper is selected from the group consisting of borax, alum, cold water, ice and an acid material.

3. A process as in claim 1 wherein the solids content is between about 12% and about 30%.

4. A process as in claim 1 wherein the pH of the slurry is between about 11 and about 12.5.

5. A process as in claim 1 wherein the reaction temperature is between about 100° and 125° F.

6. A composition suitable for use as a corrugating adhesive which comprises an adhesive formulation prepared from a single ungelatinized starch component, which adhesive formulation consists of a reaction mixture of partially swollen starch, water, and alkali in proportions such that the mixture contains between about 10% and about 40% starch solids by weight, and the pH of the mixture is between about 8 and about 13, and the mixture has a gel point between about 135° F. and about 160° F. and a Stein Hall viscosity between about 20 and about 90 seconds.

7. A composition as in claim 6 wherein the solids content is between about 12% and about 30%.

8. A composition as in claim 6 wherein the pH of the mixture is between about 11 and about 12.5.

9. A composition as in claim 6 wherein the gel point is between about 144° F. and about 152° F.

10. A composition suitable for use as a corrugating adhesive which comprises an adhesive formulation prepared from a single ungelatinized starch component, which adhesive formulation consists of a reaction mixture of partially swollen starch, water, and alkali in proportions such that the mixture contains between about 12% and about 30% starch solids by weight, and the pH of the mixture is between about 11 and about 12.5, and the mixture has a gel point between about 144° F. and 152° F. and a Stein Hall viscosity between about 20 and about 90 seconds.

References Cited

UNITED STATES PATENTS

| | | | |
|---|---|---|---|
| 1,248,039 | 11/1917 | Tunnell | 106—210 |
| 3,022,184 | 2/1962 | Kerr | 106—213 |
| 3,152,925 | 10/1964 | Patel et al. | 106—213 |
| 3,155,527 | 11/1964 | Mentzer | 106—213 |
| 3,265,632 | 8/1966 | Leach | 106—213 |

ALEXANDER H. BRODMERKEL, *Primary Examiner.*

D. J. ARNOLD, *Examiner.*

T. MORRIS, *Assistant Examiner.*

UNITED STATES PATENT OFFICE
CERTIFICATE OF CORRECTION

Patent No. 3,355,307                November 28, 1967

John J. Schoenberger et al.

It is hereby certified that error appears in the above numbered patent requiring correction and that the said Letters Patent should read as corrected below.

Column 3, line 20, for "147-159° F." read -- 147-149° F. --; column 4, line 11, for "620° F." read -- 62° F. --; column 5, line 59, after "3.0/15" insert -- Mix 10 minutes. --.

Signed and sealed this 17th day of December 1968.

(SEAL)
Attest:

Edward M. Fletcher, Jr.
Attesting Officer

EDWARD J. BRENNER
Commissioner of Patents